(12) United States Patent
Jansson et al.

(10) Patent No.: US 12,528,718 B2
(45) Date of Patent: *Jan. 20, 2026

(54) SI REMOVAL FROM AQUEOUS STREAMS OF MINERALS PROCESSING PLANTS

(71) Applicant: Metso Finland Oy, Espoo (FI)

(72) Inventors: Kaj Jansson, Tampere (FI); Eija Saari, Espoo (FI)

(73) Assignee: Metso Finland Oy, Espoo (FI)

( * ) Notice: Subject to any disclaimer, the term of this patent is extended or adjusted under 35 U.S.C. 154(b) by 390 days.

This patent is subject to a terminal disclaimer.

(21) Appl. No.: 17/927,243

(22) PCT Filed: Jun. 17, 2020

(86) PCT No.: PCT/FI2020/050438
§ 371 (c)(1),
(2) Date: Nov. 22, 2022

(87) PCT Pub. No.: WO2021/255325
PCT Pub. Date: Dec. 23, 2021

(65) Prior Publication Data
US 2023/0202873 A1 Jun. 29, 2023

(51) Int. Cl.
*B01D 21/01* (2006.01)
*B01D 21/08* (2006.01)
(Continued)

(52) U.S. Cl.
CPC ............. *C02F 1/24* (2013.01); *B01D 21/01* (2013.01); *B01D 21/08* (2013.01); *B03D 1/02* (2013.01);
(Continued)

(58) Field of Classification Search
CPC .......... C02F 1/24; C02F 1/001; C02F 1/5245; C02F 1/66; C02F 2001/007;
(Continued)

(56) References Cited

U.S. PATENT DOCUMENTS 2,387,081 A * 10/1945 Herkenhoff .............. B03D 1/02
  423/340
2,952,532 A *  9/1960 Cox ....................... B03C 1/015
  423/151

(Continued)

FOREIGN PATENT DOCUMENTS

AU    2010288155 A1 *  3/2012  ......... C22B 15/0095
CA    2932835 A1    11/2017
(Continued)

OTHER PUBLICATIONS

Zhang, X. et al. Flotation of Iron Ores: A Review. In: Mineral Processing and Extractive Metallurgy Review Taylor & Francis Group, LLC, Nov. 19, 2019, pp. 1-29.
(Continued)

*Primary Examiner* — Joseph W Drodge
(74) *Attorney, Agent, or Firm* — Andrus Intellectual Property Law, LLP

(57) ABSTRACT

A method for removing soluble and/or colloidal Si-compounds from an aqueous stream of a minerals processing plant is provided. The method includes adding coagulant(s) and/or flocculant(s) and/or flotation chemical(s) to the aqueous stream in order to facilitate formation of flocs comprising at least some of the Si-compounds, and in order to form a treated aqueous stream, subjecting the treated aqueous stream to cleaning flotation in order to separate at least some of the Si-compounds as a cleaning flotation overflow, and removing the cleaning flotation overflow. The cleaning flotation comprises gas bubbles, at least 90% of the gas bubbles having a diameter of from 0.2 to 250 μm.

16 Claims, 2 Drawing Sheets

(51) Int. Cl.
  *B03D 1/02* (2006.01)
  *C02F 1/00* (2023.01)
  *C02F 1/24* (2023.01)
  *C02F 1/52* (2023.01)
  *C02F 1/66* (2023.01)
  *C02F 101/20* (2006.01)
  *C02F 103/10* (2006.01)

(52) U.S. Cl.
  CPC ............ *C02F 1/001* (2013.01); *C02F 1/5245* (2013.01); *C02F 1/66* (2013.01); *C02F 2001/007* (2013.01); *C02F 2101/20* (2013.01); *C02F 2103/10* (2013.01); *C02F 2209/06* (2013.01)

(58) Field of Classification Search
  CPC .............. C02F 2101/20; C02F 2103/10; C02F 2209/06; C02F 2101/10; C02F 1/56; C02F 1/52; C02F 1/5236; C02F 1/54; C02F 1/542; C02F 2101/30; C02F 2101/34; C02F 2303/04; C02F 11/12; C02F 11/121; C02F 11/122; C02F 11/123; C02F 11/125; C02F 11/126; B03D 2201/002; B03D 2201/02; B03D 2201/04; B03D 2203/02; B03D 1/02; B03D 3/02; B03D 3/06; B03D 2221/02; Y02P 10/20; B01D 21/0084; B01D 21/01; B01D 21/08
  See application file for complete search history.

(56) References Cited

U.S. PATENT DOCUMENTS

| | | | | |
|---|---|---|---|---|
| 3,292,780 A | * | 12/1966 | Frommer | .................. B03D 1/06 209/166 |
| 3,430,763 A | * | 3/1969 | Iwasaki | .................... B03D 1/06 209/10 |
| 3,446,731 A | * | 5/1969 | Harsh | .................... C02F 1/5236 210/708 |
| 3,960,715 A | | 6/1976 | Dicks et al. | |
| 4,107,028 A | * | 8/1978 | Emmett, Jr. | ........... B03D 1/012 210/729 |
| 5,182,014 A | * | 1/1993 | Goodman | ................ B03D 1/06 241/20 |
| 5,311,997 A | * | 5/1994 | Gantt | ....................... B03B 9/00 209/4 |
| 2007/0102359 A1 | * | 5/2007 | Lombardi | .............. B01D 61/04 210/764 |
| 2011/0192801 A1 | * | 8/2011 | Jeanmarie | ............... C02F 1/288 210/704 |
| 2012/0125160 A1 | | 5/2012 | Gillaspie | |
| 2017/0120258 A1 | * | 5/2017 | Silva | .................. B01D 21/0084 |

FOREIGN PATENT DOCUMENTS

| | | | | |
|---|---|---|---|---|
| CA | 3036626 A1 | * | 3/2018 | .............. B03D 1/02 |
| CL | 2021001095 A | | 12/2021 | |
| CL | 2022001052 A | | 2/2023 | |
| CN | 108585139 A | | 9/2018 | |
| EP | 0463823 A2 | | 1/1992 | |
| GB | 892393 A | | 3/1962 | |
| WO | WO-2011024164 A1 | * | 3/2011 | ......... C22B 15/0095 |
| WO | 2020089506 A1 | | 5/2020 | |
| WO | 2021/084155 A1 | | 5/2021 | |

OTHER PUBLICATIONS

International Search Report and Written Opinion for PCT/FI2020/050438, mailed Sep. 11, 2020.
International Preliminary Report on Patentability for PCT/FI2020/050438, mailed Oct. 11, 2022.
Office Action for Chilean Patent Application No. 202203443, mailed Apr. 16, 2024.
Supplementary European Search Report for European Patent Application No. 20940607.3, mailed Jan. 30, 2024.
Acceptance Decision for Chinese Patent Application No. 202110672110.2, dated Apr. 17, 2025.
Office Action for Canadian Patent Application No. 3,184,621, dated Oct. 7, 2025.

* cited by examiner

SI REMOVAL FROM AQUEOUS STREAMS OF MINERALS PROCESSING PLANTS

CROSS-REFERENCE TO RELATED APPLICATIONS

This application is the U.S. national stage application of International Application PCT/FI2020/050438, filed Jun. 17, 2020, which international application was published on Dec. 23, 2021, as International Publication WO 2021/255325 A1 in the English language.

TECHNICAL FIELD

This specification relates to a method and an arrangement for removing Si from aqueous stream(s) of a minerals processing plant. Particularly, the specification relates to a method and an arrangement for removing soluble and/or colloidal Si-compounds from an aqueous stream of a minerals processing plant.

BACKGROUND

During different process phases of minerals processing pH value of the slurry tends to drop due to oxidation of sulfide minerals and absence of carbonate minerals effectively buffering the pH. Said sulfur oxidation and concomitant pH decrease also continues during the tailings processing, leading to elevated concentrations of dissolved ions, such as $SO_4$, Mg, Fe, Ni, Ca, K, Na, in the liquid phase. In addition, Si and Al are released to the liquid phase due to dissolution of (alumino)silicate minerals at low pH conditions.

Water from the tailings handling operations as well as other feed water streams, such as water from waste rock area or open pit, may have significant concentrations of dissolved substances, such as Si and metals. As the different water streams get mixed and enter the flotation process having a high pH, solubility of various chemical compounds changes. Consequently, depending on the incoming concentration of dissolved Si as well as on the pH profile of the process, the dissolved silicates may start polymerizing and forming gels and colloids either through polymerization or by reacting with different metal ions or solid surfaces.

Gels and colloids formed by the silicates may cause various problems that may eventually result in loss of valuable metals as well as reducing the recovery and quality of the final products.

Consequently, there is a need to find a solution for removal of Si-compounds from aqueous streams of a minerals processing plant. In particular, there is a need for a solution for removal of soluble and/or colloidal Si-compounds from aqueous streams of a minerals processing plant, and thus preventing the formation of gels and colloids containing silicates, as well as the problems caused by them.

SUMMARY

Aim of this specification is to provide a method and an arrangement for removing soluble and/or colloidal Si-compounds from an aqueous stream of a minerals processing plant, thereby improving the recovery and quality of the recovered product, and consequently the overall plant performance.

According to an embodiment, a method for removing soluble and/or colloidal Si-compounds from an aqueous stream of a minerals processing plant. The method comprises adding coagulant(s) and/or flocculant(s) and/or flotation chemical(s) to the aqueous stream in order to facilitate formation of flocs comprising at least some of the Si-compounds, and in order to form a treated aqueous stream, subjecting the treated aqueous stream to cleaning flotation in order to separate at least some of the Si-compounds as a cleaning flotation overflow, and removing the cleaning flotation overflow. The cleaning flotation comprises gas bubbles, at least 90% of the gas bubbles having a diameter of from 0.2 to 250 μm.

According to an embodiment, an arrangement for removing soluble and/or colloidal Si-compounds from an aqueous stream of a minerals processing plant is provided. The arrangement comprises a mixing system arranged to provide the aqueous stream with coagulant(s) and/or flocculant(s) and/or flotation chemical(s), and a cleaning flotation unit arranged to separate at least some of the Si-compounds from the aqueous stream as a cleaning flotation overflow and to form a residual process water as a cleaning flotation underflow.

Figure 1:
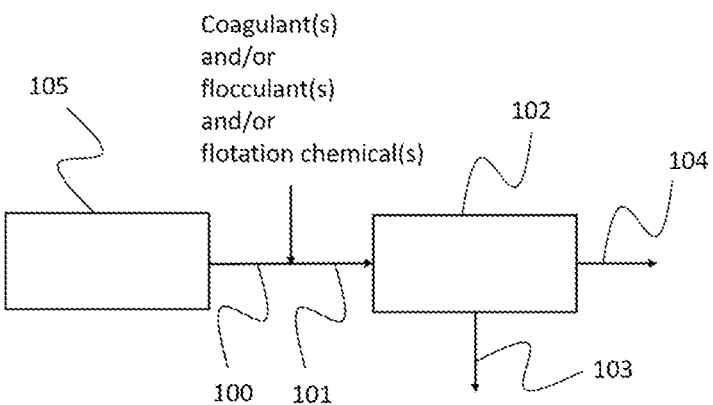
FIG. 1 illustrates, by way of an example, a schematic process flow chart according to an embodiment.

The figures are schematic. The figures are not in any particular scale.

DETAILED DESCRIPTION

The solution is described in the following in more detail with reference to some embodiments, which shall not be regarded as limiting.

In this description and claims, the term "comprising" may be used as an open term, but it also comprises the closed term "consisting of".

Following reference numbers are used in this specification:
100 aqueous stream
101 treated aqueous stream
102 cleaning flotation unit
103 cleaning flotation overflow
104 cleaning flotation underflow
105 dewatering equipment
200a aqueous stream
201 treated aqueous stream
202 cleaning flotation unit
203 cleaning flotation overflow
204 cleaning flotation underflow
205a tailings thickener
211 mineral flotation circuit
212 slurry
213 underflow of a mineral flotation circuit
214 overflow of a mineral flotation circuit
215 tailings thickener underflow
216 flotation arrangement
300a aqueous stream
301 treated aqueous stream
302 cleaning flotation unit
303 cleaning flotation overflow
304 cleaning flotation underflow

305a tailings thickener
311a first mineral flotation circuit
311b second mineral flotation circuit
312 slurry
313a underflow of a first mineral flotation circuit
313b underflow of a second mineral flotation circuit
314a overflow of a first mineral flotation circuit
314b overflow of a second mineral flotation circuit
315 tailings thickener underflow
316 flotation arrangement
400b aqueous stream
401 treated aqueous stream
402 cleaning flotation unit
403 cleaning flotation overflow
404 cleaning flotation underflow
405b concentrate thickener
411 mineral flotation circuit
412 slurry
413 underflow of a mineral flotation circuit
414 overflow of a mineral flotation circuit
416 flotation arrangement
425 concentrate thickener underflow In mining industry, beneficiation refers to a process that improves the economic value of the ore by removing gangue minerals, the process resulting in a higher grade product (concentrate) and a waste stream, i.e. tailings. Examples of beneficiation processes include e.g. froth flotation and gravity separation. Term "gangue" refers to commercially worthless material that surrounds, or is closely mixed with, a wanted mineral in an ore deposit.

Beneficiation by froth flotation is typically used for the recovery and upgrading of sulfide ores. Froth flotation is a process for separating minerals from gangue by taking advantage of differences in their hydrophobicity. Hydrophobicity differences between valuable minerals and gangue are increased through the use of surfactants and wetting agents. The flotation process is used for the separation of a large range of sulfides, carbonates and oxides prior to further refinement.

For froth flotation ground ore is mixed with water to form a slurry and the desired mineral is rendered hydrophobic by the addition of a surfactant or a collector chemical. The particular chemical depends on the nature of the mineral to be recovered, and most often on the natures of those that are not wanted. The slurry comprising hydrophobic particles and hydrophilic particles is introduced to tanks known as flotation cells that are aerated in order to produce bubbles. The hydrophobic particles attach to the air bubbles, which rise to the surface, forming a froth. The froth is removed from the cell, producing a concentrate of the target mineral. Froth flotation is typically undertaken in several stages to maximize the recovery of the target mineral or minerals and the concentration of those minerals in the concentrate.

Amount of gangue in ore is increasing. Of gangue minerals, amount of Si-containing minerals is increasing. Majority of these Si-containing minerals can be found as Feldspar ($KAlSi_3O_8$—$NaAlSi_3O_8$—$CaAl_2Si_2O_8$) and Quartz ($SiO_4$/$SiO_2$) that are the two most abundant minerals in Earth's continental crust. The backbone of these minerals comprises mainly a continuous framework of silicon-oxygen tetrahedra with commonly Fe, Al, Mn or Mg as impurities in the structure. The otherwise very rigid structure may be vulnerable to external conditions such as pH changes because of the impurities. Consequently, the structure may split to smaller fractions. When this takes place in the process, the silicates may become solubilized or colloidal. If pH increases, the Si-containing particle may react with different compounds thus forming new structures. As the silicate rebuilds its structure, formation of for example ribbon-like structures may result. These structures may cause increase in viscosity, thus causing problems in beneficiation/concentration.

Typically, the gangue removed in the beneficiation process is sent to a tailings dam where the long resident time, typically 20-40 days, is expected to sediment and separate the solids as well as decompose residual flotation chemicals from the collected and reusable process water. The collected process water may then be recirculated back into the beneficiation process. The quality of the recirculated process water plays a role in obtaining target recoveries and qualities of the final product.

Today, water shortage, ecological demands placed by legislation and public pressure, costs and extensive space requirements of the conventional tailings methods for process water treatment increasingly put pressure to recirculate process waters as main processes in beneficiation become at least partially closed-loop systems in terms of water usage. In closed-loop systems, the process water may become at times supersaturated with respect to silicates. It has been shown that major part of the total Si is present as colloids, instead of soluble compounds.

As mentioned above, gels and colloids formed by the silicates may cause various problems that may eventually result in loss of valuable metals as well as reducing the recovery and quality of the final products. Problems may arise for example through adsorption of colloids to mineral surfaces, thus preventing collector adsorption on mineral surfaces. Adsorption of collectors into colloids prevents collectors from adsorbing on mineral surfaces, which is essential in order to promote flotation, thus causing decrease in flotation kinetics. Further, valuable metals may get trapped inside gel matrix, thus causing decrease in metal recovery. Further, gels and colloids may cause thickening problems (non-settleable colloids, their circulation back to the flotation process) or even concentrate filtration problems (higher cake moisture due to an aqueous gel). Silicates are known to form hydrophilic layers on valuable mineral surfaces, thus making them less floatable.

Further, Si in aqueous solutions is prone to formation of complexes with Fe. The complexes formed may be fine colloidal particles. The fine colloidal particles containing Si and Fe cause excess fines load, which may have a negative influence on froth flotation. Si and Fe together may form coatings/layers onto the ore surface, thus altering the flotation properties of the ore and eventually causing decrease in the ore recovery. The complexes containing Si and Fe may cause redox-properties of the ore to change, thus altering the ore's frothing properties. For example, pentlandite (an iron-nickel sulfide) may get oxidised by the influence of complexes containing Si and Fe. The frothing properties of the oxidised pentlandite differ from those of the unoxidized one, which may have a negative effect on the ore recovery.

Fe itself may affect especially the recovery of Ni by flotation. Excess iron contained by the process water may cause formation of Fe-hydroxide based coatings onto the pentlandite ore used for Ni recovery, thus causing decrease in the Ni recovery.

The amount of soluble and/or colloidal silicon compounds in the minerals processing waters may be over 100 ppm, often even as high as 300-400 ppm. Soluble silicon compounds may also be called dissolved silicon compounds. The existence of soluble and/or colloidal silicon compounds in aqueous streams of the minerals processing plant has not generally been identified before. For water analysis, it has been a general practice to filter the water sample before performing the elementary analysis. Typical filters having a pore size of 0.45 μm cause the colloidal silicon compounds to be filtered from the sample. Further, the above discussed disadvantages of the soluble and/or colloidal silicon to the minerals processing have not been understood.

This specification aims to provide a method and an arrangement for removal of soluble and/or colloidal Si-compounds from aqueous streams of a minerals processing plant, and thus preventing the formation of gels and colloids containing Si-compounds, as well as the problems caused by them. Further, as the aqueous streams typically comprise Fe complexed with Si, the method also provides a route for removing at least some of the iron comprised by the aqueous streams of the minerals processing plant.

Within context of this specification, Si-compounds refers to compounds containing silicon and appearing in the substances related to the minerals processing. Si-compounds include silicates. Term silicate may refer to any member of a family of anions consisting of silicon and oxygen, any salt of such anions, or any ester of such anions. Term silicate also includes those anions that comprise a continuous framework of $SiO_4$ tetrahedra having metals, typically Fe, Al, Mn or Mg, as impurities in the structure. Term silicate also includes silicate minerals as well as rock types comprising predominantly such minerals. Quartz ($SiO_2$) may also be included in the silicates. Silicates also include minerals wherein aluminium or other tetravalent atom(s) replace some of the silicon atoms, such as aluminosilicates.

Within context of this specification, a colloidal suspension or a colloid is a mixture in which a substance of microscopically dispersed insoluble or soluble particles is suspended throughout another substance. In order to qualify as a colloid, the insoluble or soluble particles do not settle or would take a very long time to settle appreciably. Thus, herein term colloidal Si-compounds refers to silicon containing compounds that are suspended in water forming a mixture where insoluble or soluble particles do not settle or would take a very long time to settle.

Within context of this specification, "removal" or "removing" of soluble and/or colloidal Si-compounds may refer to a process of entirely eliminating said compounds or to a process wherein the amount of said compounds is reduced, i.e. the amount of Si-compounds in the aqueous stream to be treated is higher than the amount of said compounds in the stream obtained after performing the method disclosed herein.

In a method according to an embodiment and as illustrated in FIG. 1, coagulant(s) and/or flocculant(s) and/or flotation chemical(s) is/are added to an aqueous stream 100 of a minerals processing plant. Thus, colloidal particles and suspended solids are destabilized and combined into even larger aggregates that can be separated from the aqueous solution. A treated aqueous stream 101 is formed.

The treated aqueous stream 101 is subjected to cleaning flotation in a cleaning flotation unit 102. The cleaning flotation comprises gas bubbles, wherein at least 90% of the gas bubbles have a diameter of from 0.2 to 250 μm. At least some of the soluble and/or colloidal Si-compounds are arranged to be separated as a cleaning flotation overflow 103. A cleaning flotation underflow 104 comprises residual process water. The cleaning flotation overflow 103 comprising at least some of the soluble and/or colloidal Si-compounds may be removed as tailings. The cleaning flotation underflow 104 may be recirculated back into the process for use as process water.

The aqueous stream wherefrom the soluble and/or colloidal Si-compounds are to be removed may comprise water from a dewatering equipment 105. The dewatering equipment 105 may comprise a sedimentation device or a filter. The sedimentation device may be for example a thickener or a clarifier. The aqueous stream 100 to be treated may comprise at least a part of a stream obtained from the dewatering equipment 105. Alternatively or additionally, the aqueous stream 100 may comprise mine drainage water or water collected from a tailings dam.

Figure 2:
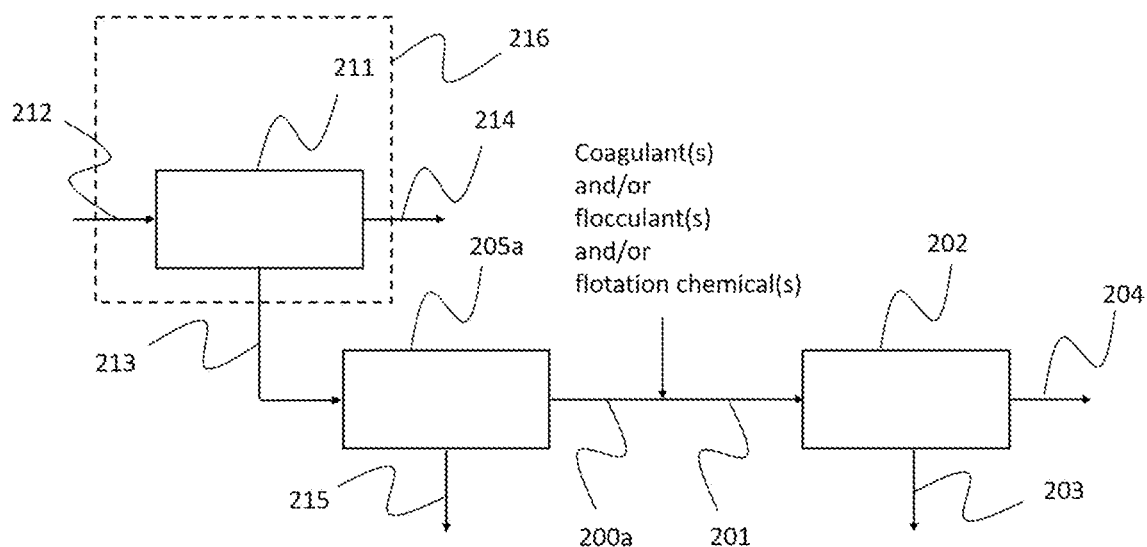
FIG. 2 illustrates, by way of an example, a schematic process flow chart according to an embodiment.

According to an embodiment and as illustrated in FIG. 2, the aqueous stream 200a obtained from the dewatering equipment, herein a tailings thickener 205a, originates from a flotation arrangement 216 comprising a mineral flotation circuit 211 arranged to treat ore particles suspended in a slurry 212 by flotation for recovery of ore.

The mineral flotation circuit 211 is arranged to separate the slurry 212 into an underflow of the mineral flotation circuit 213 and an overflow of the mineral flotation circuit 214. The overflow of the mineral flotation circuit 214 comprises recovered material.

Figure 3:
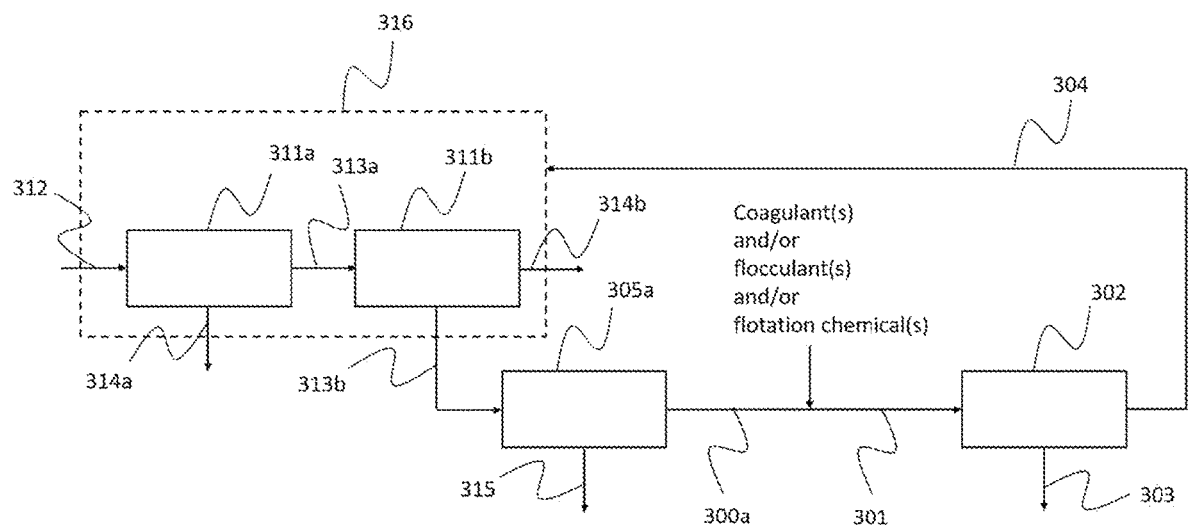
FIG. 3 illustrates, by way of an example, a schematic process flow chart according to an embodiment.

The flotation arrangement 216 may be arranged to recover Ni and/or Cu. As illustrated in FIG. 3, the flotation arrangement 316 may comprise a first mineral flotation circuit 311a arranged to recover Cu and a second mineral flotation circuit 311b arranged to recover Ni. The first and the second mineral flotation circuits may have common or separate water circuits.

According to an embodiment, the dewatering equipment comprises a sedimentation device, which is a thickener. The thickener is configured to operate as a solid-liquid separator in order to separate a sediment, i.e. the thickener underflow, from a supernatant, i.e. the thickener overflow. The thickener underflow comprises particles having a density higher than the one of the liquid, and thus ending up in the sediment.

Figure 4:
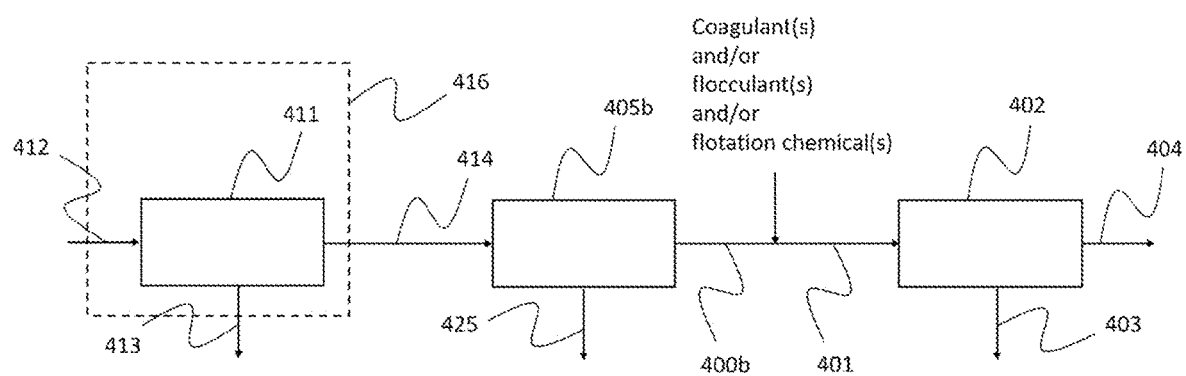
FIG. 4 illustrates, by way of an example, a schematic process flow chart according to an embodiment.

The thickener may be a so-called concentrate thickener 405b, as illustrated in FIG. 4. The overflow of the mineral flotation circuit 414 may be led into the concentrate thickener 405b. In the concentrate thickener 405b water absorbed by the particles and increasing the density of the recovered ore may be removed in order to enable the concentrate to be transported easily and to allow further processing thereof. In the concentrate thickener 405b the overflow of the mineral flotation circuit 414 is dewatered in order to produce a concentrate thickener overflow 400b and a concentrate thickener underflow 425. The concentrate thickener underflow 425 comprises the recovered ore, i.e. the concentrate, and is taken from the concentrate thickener 405b to further processing. The concentrate thickener overflow 400b may be treated according to a method disclosed herein.

Alternatively, the thickener may be a so-called tailings thickener 205a, 305a, as illustrated in FIGS. 2 and 3. The underflow of the mineral flotation circuit 213, 313b may be led into the tailings thickener 205a, 305a. In the tailings thickener 205a, 305a, the underflow of the mineral flotation circuit 213, 313b is dewatered in order to produce a tailings thickener overflow 200a, 300a and a tailings thickener underflow 215, 315. The tailings thickener overflow 200a, 300a may be treated according to a method disclosed herein. The tailings thickener underflow 215, 315 is removed from the tailings thickener 205a, 305a. The tailings thickener underflow 215, 315 is typically removed from the thickener as tailings. The solids content of the tailings thickener underflow 215, 315 may be at least 80 wt. %.

According to an embodiment, the aqueous stream 100, 200a, 300a, 400b wherefrom the soluble and/or colloidal Si-compounds are to be removed comprises thickener overflow. The thickener overflow may originate from a concentrate thickener 405b and/or a tailings thickener 205a, 305a. The thickener overflow comprises process water and soluble and/or colloidal Si-compounds. The thickener overflow may further comprise Si-containing particles as well as other undesired, detrimental or unrecovered material or compounds such as fine particles and larger particles, starch-based depressants, microbes etc., suspended and/or dissolved in process water.

Prior to subjecting the thickener overflow to the cleaning flotation, it may be led to a thickener overflow tank in order to stabilize the thickener overflow.

The coagulant(s) and/or flocculant(s) may be added to the aqueous stream 100, 200a, 300a, 400b in any suitable manner, as long as proper mixing of the coagulant(s) and/or flocculant(s) to the aqueous stream 100, 200a, 300a, 400b is ensured. For example, the coagulant(s) and/or flocculant(s) may be added in a mixing unit.

According to an embodiment, the cleaning flotation is dissolved air flotation (DAF). DAF is a flotation process which is used in various applications in water or effluent clarification. Solid particles are separated from liquid by using small flotation gas bubbles, which may be called microbubbles. The microbubbles may be for example generated by dissolving air or other flotation gas into the liquid under pressure. The bubbles are formed in a pressure drop when dispersion is released. The particles of solid form attach to the bubbles and rise to the surface. A formed, floating sludge may be removed from the liquid surface with sludge rollers as DAF overflow.

As a result of the method described, turbidity of the aqueous stream may be diminished 50-99%. Turbidity refers to cloudiness or haziness of a fluid caused by large numbers of individual particles that are generally invisible to the naked eye. Turbidity is caused by the suspended solid matter of very small particles that settle only very slowly or not at all, or by the colloidal particles.

According to an embodiment, the cleaning flotation underflow 104, 204, 304, 404 or at least part of it is recirculated back into the flotation process or into a process preceding flotation. The cleaning flotation underflow 104, 204, 304, 404 or at least part of it may be recirculated for example via grinding into the flotation. FIG. 3 illustrates an arrangement wherein the cleaning flotation underflow 104, 204, 304, 404 or at least part of it is recirculated back into the flotation arrangement 216, 316, 416 for use in the mineral flotation. In a case the water for flotation or for the process preceding flotation, such as grinding, is taken from the tailings area, the pH of the water taken is low, as the pH of the tailings water is getting lower in time. Metals contained by the tailings get more easily dissolved into the water of low pH. For the flotation process, the pH of the slurry has to be raised, which causes the once dissolved metals to precipitate. The precipitates, for one, cause problems for the flotation process. The metals and other impurities contained by the water used may also cause lowering of the quality of the mineral surface already in grinding. Thus, the above described problems may be avoided by recirculating the cleaning flotation underflow back into the flotation or even into a process preceding flotation, such as grinding.

The coagulant may be chosen from a group comprising: inorganic coagulants, aluminium salts, iron salts, organic coagulants. Preferably the coagulant is an aluminium salt or an iron salt. The coagulant is arranged to produce coagulation. Coagulation refers to a process through which colloidal particles and suspended solids are destabilized to form "microflocs" that can begin to agglomerate if the conditions are appropriate. Coagulation is a chemical process that involves neutralization of charge. Coagulation is effected by the type of coagulant used, its dose and mass; pH and initial turbidity of the water being treated; as well as properties of the unwanted matter present.

In a colloidal suspension, particles settle very slowly or not at all because the colloidal particles carry surface electrical charges that mutually repel each other. This surface charge may be evaluated in terms of zeta potential. In order to induce coagulation, a coagulant with opposite charge is added to the water to overcome the repulsive charge and to destabilize the suspension. Once the repulsive charges have been neutralized, van der Waals forces will cause the particles to agglomerate and form floc(s).

The flocculant may be a synthetic polymer or a natural polymer or their derivative. Flocculants are agents that promote flocculation by causing colloids and other suspended particles in liquids to aggregate, forming a floc. Flocculation refers to a process wherein destabilized particles are actually combined into even larger aggregates known as flocs so that they can be separated from water by sedimentation or flotation. Many flocculants comprise multivalent cations such as aluminium, iron, calcium or magnesium. These positively charged molecules may interact with negatively charged particles and molecules in order to reduce the barriers to aggregation. Some flocculants may react with water and form insoluble hydroxides which, upon precipitating, link together to form long chains or meshes, physically trapping small particles into a larger floc. Natural polymer or its derivative may include for example starch or modified starch, or polysaccharides. Examples of synthetic polymers include for example high molecular weight (over 500 000) flocculants such as polyacrylamides (negatively or positively charged, or neutral), or Mannich products (positively charged); and low molecular weight (under 500 000) flocculants such as polyamines (positively charged), polyepiamine (positively charged), polyDADMAC (positively charged), poly(ethylene) imines (positively charged), or polyethylene oxide (neutral).

The flotation chemical(s) that may be added to the aqueous stream in order to facilitate formation of flocs comprising at least some of the Si-compounds, and in order to form a treated aqueous stream may comprise at least one of a group comprising: collectors, activators, depressants, frothers, modifiers. Collectors may comprise surface-active organic reagents such as thiol compounds, alkyl carboxylates, alkyl sulfates, alkyl sulfonates, alkyl phosphates, amines, chelating agents, and alkyl phosphonic acids. Activators may comprise for example metal hydroxo compounds or sodium sulfide. Depressants may comprise for example sodium sulfide or cyanide salts. Frothers may comprise for example alcohols, polyethers, ethylene oxide, and polyglycol ethers.

According to an embodiment, pH of the aqueous stream 100, 200a, 300a, 400b is adjusted to be in a range of 4.5-10 prior to subjecting the treated aqueous stream 101, 201, 301, 401 to the cleaning flotation. The pH of the aqueous stream may be adjusted prior to adding coagulant(s) and/or flocculant(s) and/or flotation chemical(s) to the aqueous stream. Thus, pH of treated aqueous stream 101, 201, 301, 401 is in a range of 4.5-10 prior to subjecting it to cleaning flotation.

According to an embodiment an iron salt is used as a coagulant. In that case, pH of the aqueous stream 100, 200a, 300a, 400b may be adjusted to be in a range of 5-8 prior to subjecting the treated aqueous stream 101, 201, 301, 401 to the cleaning flotation in order to obtain efficient coagulation.

The pH range of 5-8 may be preferred, as iron hydroxide is known to precipitate in said pH range. The pH of the aqueous stream may be adjusted in any suitable manner. The pH may be adjusted for example in a mixing unit. Using iron salt as the coagulant is beneficial as the aqueous stream already contains Fe, and thus smaller amount of coagulant may be needed in order to obtain the desired coagulation. Further, flocs formed by the use of iron salt as coagulant may be more durable under cleaning flotation conditions, thus improving the efficiency of cleaning flotation.

The method described herein has the effect that the treated process water, i.e. the liquid obtained from the cleaning flotation unit is insofar pure in terms of soluble and/or colloidal Si-compound content that it is possible to reuse the treated process water without negatively influencing the outcome of the process. Si-removal rates of between 55-90% may be obtained depending on the composition of the aqueous stream in question.

Further, as the aqueous streams typically comprise Fe complexed with Si, the method also provides a route for removing at least some of the iron comprised by the aqueous streams of the minerals processing plant. Thus the problems caused by the Si and Fe containing complexes as well as the excess iron itself may be avoided. Depending on the coagulant dosage and composition of the aqueous stream about 60-90% of the iron contained by aqueous streams may be removed by the method disclosed herein.

The invention claimed is:

1. A method for removing soluble and/or colloidal Si-compounds from an aqueous stream of a minerals processing plant, the method comprising:
    adding coagulant(s) and/or flocculant(s) and/or flotation chemical(s) to the aqueous stream in order to facilitate formation of flocs comprising at least some of the Si-compounds, and in order to form a treated aqueous stream;
    subjecting the treated aqueous stream to cleaning flotation in order to separate at least some of the Si-compounds as a cleaning flotation overflow; and
    removing the cleaning flotation overflow,
    wherein the cleaning flotation comprises gas bubbles, at least 90% of the gas bubbles having a diameter of from 0.2 to 250 μm, wherein the aqueous stream comprises water obtained from dewatering equipment, wherein the aqueous stream obtained from the dewatering equipment originates from a flotation arrangement comprising a mineral flotation circuit arranged to treat ore particles suspended in a slurry by flotation for recovery of ore.

2. The method according to claim 1, wherein the dewatering equipment comprises a sedimentation device or a filter.

3. The method according to claim 1, wherein the dewatering equipment comprises a sedimentation device that is a thickener.

4. The method according to claim 1, wherein the aqueous stream comprises at least a part of a stream obtained from the dewatering equipment.

5. The method according to claim 1, wherein the flotation arrangement is arranged to recover Ni and/or Cu.

6. The method according to claim 1, wherein the mineral flotation circuit of the flotation arrangement comprises a first mineral flotation circuit arranged to recover Cu and a second mineral flotation circuit arranged to recover Ni.

7. The method according to claim 1, wherein the step of subjecting the treated aqueous stream to cleaning flotation creates a cleaning flotation underflow, wherein the method further comprises recirculating at least part of the cleaning flotation underflow back to the flotation arrangement.

8. The method according to claim 1, wherein at least one coagulant is added to the aqueous stream and the at least one coagulant comprises an aluminum salt.

9. The method according to claim 1, wherein at least one coagulant is added to the aqueous stream and the at least one coagulant comprises an iron salt.

10. The method according claim 1, wherein pH of the aqueous stream is adjusted to be in a range of 4.5-10 prior to subjecting the treated aqueous stream to the cleaning flotation.

11. The method according to claim 1, wherein the aqueous stream comprises Fe complexed with Si, and the method comprises removing at least some of the Fe from the aqueous stream.

12. The method according to claim 1, wherein the cleaning flotation comprises a dissolved air flotation method step.

13. An arrangement for removing soluble and/or colloidal Si-compounds from an aqueous stream of a minerals processing plant, comprising:
    a flotation arrangement comprising a mineral flotation circuit arranged to treat ore particles suspended in a slurry by flotation for recovery of ore;
    dewatering equipment arranged to receive the aqueous stream from the flotation arrangement;
    a mixing system arranged to provide the aqueous stream from the dewatering equipment with coagulant(s) and/or flocculant(s) and/or flotation chemical(s), and
    a cleaning flotation unit arranged to receive the aqueous stream from the mixing system and to separate at least some of the Si-compounds from the aqueous stream as a cleaning flotation overflow and to form a residual process water as a cleaning flotation underflow.

14. The arrangement according to claim 13, wherein the dewatering equipment comprises a sedimentation device or a filter.

15. The arrangement according to claim 13, wherein the dewatering equipment comprises a sedimentation device, wherein the sedimentation device is a thickener.

16. The arrangement according to claim 13, wherein the cleaning flotation unit is a dissolved air flotation unit.

* * * * *